United States Patent
Cree et al.

(10) Patent No.: US 6,665,380 B1
(45) Date of Patent: Dec. 16, 2003

(54) INMATE MESSAGING SYSTEM AND METHOD

(75) Inventors: Richard E. Cree, Dallas, TX (US); John D. McFarlen, Arlington, TX (US)

(73) Assignee: T-Netix, Inc., Carrollton, TX (US)

( * ) Notice: Subject to any disclaimer, the term of this patent is extended or adjusted under 35 U.S.C. 154(b) by 0 days.

(21) Appl. No.: 09/229,385

(22) Filed: Jan. 11, 1999

(51) Int. Cl.[7] .............................. H04M 1/64; H04M 3/00
(52) U.S. Cl. ................ 379/88.25; 376/67.1; 376/88.17; 376/88.18; 376/88.19; 376/265.01; 376/265.13
(58) Field of Search .......................... 379/112.04, 88.04, 379/67.1, 70, 76, 88.12, 88.17, 88.18, 88.19, 88.22, 88.25, 265.01, 265.03, 265.13

(56) References Cited

U.S. PATENT DOCUMENTS

| | | |
|---|---|---|
| 3,851,121 A | 11/1974 | Marvin |
| 4,001,513 A | 1/1977 | Naylor |
| 4,002,848 A | 1/1977 | Stein |
| 4,054,756 A | 10/1977 | Comella et al. |
| 4,188,508 A | 2/1980 | Rogers et al. |
| 4,310,726 A | 1/1982 | Asmuth |
| 4,405,833 A | 9/1983 | Cave et al. |
| 4,518,825 A | 5/1985 | Brikerhoff et al. |
| 4,559,416 A | 12/1985 | Theis et al. |
| 4,602,129 A * | 7/1986 | Matthews et al. ............ 179/18 |
| 4,696,031 A | 9/1987 | Freudberg et al. |
| 4,726,057 A | 2/1988 | Doerry et al. |
| 4,799,255 A | 1/1989 | Billinger et al. |
| 4,815,120 A | 3/1989 | Kosich et al. |
| 4,885,765 A | 12/1989 | Shirakawa |
| 4,896,348 A | 1/1990 | Grantland et al. |
| 4,899,375 A | 2/1990 | Bauer et al. |
| 4,901,341 A | 2/1990 | Carter et al. |
| 4,922,519 A | 5/1990 | Daudelin |
| 4,922,520 A | 5/1990 | Bernard et al. |
| 4,924,488 A | 5/1990 | Kosich |

(List continued on next page.)

OTHER PUBLICATIONS

Bahl, L. "A Maximum Likelihood Approach to Contiuous Speech Recovery," Readings in Speech Recognition Ed. A. Waibel and K. Lee, Morgan Kaufmann Publishers, pp 308–319, IEEE 1983.

(List continued on next page.)

*Primary Examiner*—Allan Hoosain
(74) *Attorney, Agent, or Firm*—Fenwick & West LLP

(57) ABSTRACT

An inmate messaging system and method for notifying an inmate in a prison facility of messages received from a caller outside the prison facility. The caller dials into the inmate messaging system using, for example, a conventional "touch tone" telephone. The caller is prompted by the system for identifying information, which is verified against known information in a database. Identifying information can include a PIN for verifying the caller's account. During a set-up session, the system prompts the caller to record her name. The name recording is used to verify the account when the caller leaves a message for the inmate, and is also used to identify the account when the inmate retrieves the message from within the prison. The caller can specify a time with the message for returning the telephone call, or have the call placed immediately. The inmate accesses the inmate messaging system via a prison telephone. If messages are pending for inmates residing in the vicinity of the phone, the inmate is provided with an option to retrieve a list of such pending messages. To hear specific messages, the inmate enters identifying information, such as a PIN. If the PIN is successfully verified, the system informs the inmate that a return call can be made to the caller anytime, or at a time specified by the caller.

22 Claims, 13 Drawing Sheets

U.S. PATENT DOCUMENTS

| | | |
|---|---|---|
| 4,933,966 A | 6/1990 | Hird et al. |
| 4,933,967 A | 6/1990 | Lo et al. |
| 4,935,956 A | 6/1990 | Hellwarth et al. |
| 4,937,862 A | 6/1990 | Kosich |
| 4,993,068 A | 2/1991 | Poisenka et al. |
| 5,023,906 A | 6/1991 | Novas |
| 5,033,088 A | 7/1991 | Shipman |
| 5,054,059 A | 10/1991 | Stern et al. |
| 5,063,593 A | 11/1991 | Kwon |
| 5,109,405 A | 4/1992 | Morganstein |
| 5,131,024 A | 7/1992 | Pugh et al. |
| 5,150,357 A | 9/1992 | Hopner et al. |
| 5,155,761 A * | 10/1992 | Hammond .................... 379/67 |
| 5,163,083 A | 11/1992 | Dowden et al. |
| 5,187,740 A | 2/1993 | Swaim et al. |
| 5,200,995 A | 4/1993 | Gaukel et al. |
| 5,210,789 A | 5/1993 | Jeffus et al. |
| 5,222,120 A | 6/1993 | McLeod et al. |
| 5,229,764 A | 7/1993 | Matchett et al. |
| 5,276,731 A | 1/1994 | Arbel et al. |
| 5,305,312 A | 4/1994 | Fornet et al. |
| 5,309,505 A | 5/1994 | Szlam et al. |
| 5,311,589 A | 5/1994 | Bennett et al. |
| 5,319,702 A | 6/1994 | Kitchin et al. |
| 5,325,421 A * | 6/1994 | Hou et al. .................... 379/67 |
| 5,325,427 A | 6/1994 | Dighe |
| 5,327,489 A | 7/1994 | Anderson et al. |
| 5,329,578 A | 7/1994 | Brennan et al. |
| 5,345,595 A | 9/1994 | Johnson et al. |
| 5,351,287 A | 9/1994 | Bhattacharyya et al. |
| 5,355,403 A | 10/1994 | Richardson, Jr. et al. |
| 5,375,161 A | 12/1994 | Fuller et al. |
| 5,442,696 A | 8/1995 | Lindberg et al. |
| 5,452,347 A | 9/1995 | Iglehart et al. |
| 5,465,293 A | 11/1995 | Chiller et al. |
| 5,471,519 A | 11/1995 | Howe et al. |
| 5,483,582 A | 1/1996 | Pugh et al. |
| 5,483,593 A | 1/1996 | Gupta et al. |
| 5,535,261 A * | 7/1996 | Brown et al. ................. 379/67 |
| 5,539,812 A | 7/1996 | Kitchin et al. |
| 5,544,231 A | 8/1996 | Cho |
| 5,566,229 A | 10/1996 | Hou et al. |
| 5,583,920 A * | 12/1996 | Wheeler, Jr. ................. 379/88 |
| 5,583,934 A | 12/1996 | Zhou |
| 5,606,604 A | 2/1997 | Rosenblatt |
| 5,617,471 A | 4/1997 | Rogers et al. |
| 5,627,887 A | 5/1997 | Freedman |
| 5,651,056 A | 7/1997 | Eting et al. |
| 5,655,013 A * | 8/1997 | Gainsboro .................. 379/188 |
| 5,722,418 A * | 3/1998 | Bro ............................ 128/732 |
| 5,724,404 A | 3/1998 | Garcia et al. |
| 5,745,553 A | 4/1998 | Mirville et al. |
| 5,796,811 A | 8/1998 | McFarlen |
| 5,799,068 A | 8/1998 | Kikinis et al. |
| 5,805,685 A | 9/1998 | McFarlen |
| 5,809,125 A | 9/1998 | Gammino |
| 5,867,559 A * | 2/1999 | Jorgensen et al. ............. 379/67 |
| 5,883,945 A | 3/1999 | Richardson, Jr. et al. |
| 5,943,403 A | 8/1999 | Richardson, Jr. et al. |
| 5,946,386 A * | 8/1999 | Rogers et al. ............. 379/265 |
| 5,960,064 A | 9/1999 | Foladare et al. |
| 6,052,454 A * | 4/2000 | Kek et al. .................... 379/188 |
| 6,064,963 A | 5/2000 | Gainsboro |
| 6,072,860 A | 6/2000 | Kek ert al. |
| 6,075,843 A * | 6/2000 | Cave ....................... 379/88.13 |
| 6,141,406 A | 10/2000 | Johnson |
| RE37,073 E * | 2/2001 | Hammond .................... 379/67 |
| 6,188,751 B1 | 2/2001 | Scherer |
| 6,366,653 B1 | 4/2002 | Yeh et al. |
| 2001/0036821 A1 * | 11/2001 | Gainsboro et al. .......... 455/410 |

OTHER PUBLICATIONS

Batten, A. "Personal Communications Service and the Intelligent Network," British Telecommunications Engineering, vol. 9, pp 88–91 Aug. 1990.

Lee, K. "Large–Vocabulary Speaker–Independent Continuous Speech Recognition Using HMM," Carnegie Mellon University Department of Electrical and Computer Engineering, CMU–CS–88–148 Apr. 1988.

System 20, Nov. 1992, Specially designed for correctional facilities, from County Jails to State and Federal Prisons. VAC.

Telematic "ConQuest III Intimate Telephone System" Nov. 1992.

LazerVoice, Digital Recording System Inmate Services, 1997–98 Schlumberger Technologies, Inc./LazerVoice ,STIL V0222 LazerVoice User's Manual—Version 2.22.

LazerPhone User Reference Manual.

LazerPhone, Inmate Telephone System, Users Manual, 1998 Schlumberger Technologies, Inc./Global Tel*Link, LazerPhone User's Manual—Version 1.0.

LazerPhone, Powerful Performance Uncompromising Standards, 1998.

LazerPhone Technical Manual, System Overview.

* cited by examiner

~ 228

_ACCOUNT_
_INFORMATION_

ACCOUNT NO.
PIN
ACCOUNT STATUS
NAME
ADDRESS
TELEPHONE NO.

_MESSAGE_
_INFORMATION_

DATE OF MESSAGE
TIME OF MESSAGE
CALL BACK TIME
MESSAGE STATUS
MESSAGE CNTR.

_INMATE_
_INFORMATION_

ACCOUNT NO.
PIN
NAME
INMATE NO.
CELL BLOCK NO.

*FIG. 2C*

INMATE MESSAGING SYSTEM AND METHOD

FIELD OF THE INVENTION

The invention relates to the field of telecommunications and, more particularly, to an inmate messaging system and method for notifying an inmate in a prison facility of messages received from a caller outside the prison facility.

BACKGROUND OF THE INVENTION

Conventional inmate telephone systems and methods require an inmate to arrange a time with a remote party for executing a telephone call. Unfortunately, the remote party often cannot take the call from the inmate because of sudden schedule conflicts, thus forcing the inmate to call again at a later time. These repetitive outgoing calls, when multiplied by the number of inmates in a typical prison facility, can generate large telephone bills that must be paid by the prison facility.

In conventional messaging systems, a user acquires a messaging device from a service provider. The user is contacted by a third party by calling into a messaging system which, in turn, calls the user's pager to deliver a voice or numeric message from the third party. Such conventional systems, however, are not practical in a controlled prison environment where prisoners' communications with remote parties must be carefully monitored for illegal activity. Nor is it desirable to place electronic devices in the hands of prisoners who are notorious for their clever exploitation of prison property for personal gain or advantage.

Accordingly, there is a need within the inmate telephone industry to facilitate notification of inmates when a remote party desires to communicate with an inmate via the inmate telephone system. Such a system and method should capture and allocate costs associated with operating the inmate telephone system, and facilitate the billing of the appropriate remote parties. Additionally, such a system and method should be adapted to function in a prison environment to prevent the inmates from exploiting the system for personal gain or advantage.

SUMMARY OF THE INVENTION

The present invention is directed to an inmate messaging system and method for notifying an inmate in a prison facility of messages received from a caller outside the prison facility.

In a preferred embodiment of the present invention, a remote caller establishes a message account with an inmate messaging system responsible for providing messaging services to a prison facility. The remote caller's account information is processed by the inmate messaging system in an automated manner. Preferably, remote caller accounts are accessed with, for example, an account number and a Personal Identification Number ("PIN"), or other identification information, such as voice recognition or bar codes on calling cards. If PINs are used, then a different PIN can be assigned to the remote caller and the inmate to allow both parties to access the same account. Each remote caller can contact several inmates, but each inmate preferably appears on an active list of inmates stored in an remote caller database in the inmate messaging system. Charges for use of the system can be based on a per inmate basis.

A remote caller can activate the messaging service by recording his or her name when setting up an account with the inmate messaging system. These name recordings are used by the inmate messaging system to identify the owner of the account when an inmate retrieves messages, and to verify the account when the remote caller leaves a message for an inmate.

In a preferred embodiment of the present invention, a remote caller creates a name recording by dialing into the inmate messaging system and recording his or her name in response to audio message prompts. The remote caller's name is digitized by a speech digitizer and written to a file in disk storage. The remote caller is then allowed to hear and confirm the name recording. If the remote caller confirms the name recording, the remote caller continues with the call session. If the remote caller rejects the name recording, a predetermined number of additional attempts to get an acceptable recording are offered to the remote caller. If these attempts fail also, the remote caller must call a messaging service operator for assistance. Name recordings may not be changed after the initial setup session without first contacting the messaging service operator.

In a preferred embodiment of the present invention, an audio menu of options is provided to an inmate when he picks up the receiver of the inmate telephone system. If messages are pending for inmates residing in the vicinity of the phone (e.g., within a prison cell block), one option is to retrieve a list of such messages. Preferably, the inmate messaging system plays back the list of pending messages for inmates in the cell block in response to an inmate lifting the telephone receiver off its hook. The inmate messaging system also provides a function that allows inmates to check their own messages.

To simplify the checking of pending messages by inmates, digitized name recordings can be played back to the inmate instead of account or PIN numbers. For example, when checking for messages for a specific inmate, the inmate messaging system asks the inmate to enter an account number and a PIN. The inmate then enters an account number and PIN. If one or more messages exist for that account number, the inmate messaging system informs the inmate of the pending messages by playing the recorded name of the remote caller that is associated with the message account storing the message.

In a preferred embodiment of the present invention, after the inmate messaging system identifies pending messages for the inmate, the inmate messaging system informs the inmate that a return call can be made to the remote caller at anytime, or at a specific time entered by the remote caller. If no specific time is stated, the inmate messaging system asks the inmate if he/she wants to return the call now, later, or never by pressing the appropriate key on the telephone. Depending on the inmate's response, the inmate messaging system will place the call and mark the message as completed, or if refused, mark the message as refused. The remote caller can then retrieve this information to determine the disposition of the call, thus precluding the remote caller from thinking that the inmate telephone system is not working. If there is a specific time listed for the inmate to return a call, the inmate is informed of such time and prompted to call back at that time. Preferably, pending messages for a particular inmate are delivered to the cell block where the inmate is housed each time an inmate picks up the phone receiver to place a call.

An advantage of present invention is that inmates in a prison facility can be notified of pending messages in an efficient and economical manner. For example, the preferred embodiment of the present invention allows the remote caller to specify a call back time with the message to ensure that the remote caller is available to receive the return call from the inmate.

Another advantage of the present invention is that all messaging functions are properly controlled by the messaging system to prevent their exploitation by inmates.

Still another advantage of the present invention is the ability to track messages between remote callers and inmates for both billing and security purposes. All costs accrued during the use of the inmate messaging system are accounted for by the inmate messaging system to ensure that the appropriate party (e.g., the remote caller) is billed by the messaging service.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 2C is an illustration of one embodiment of a call detail record in accordance with the present invention;

DETAILED DESCRIPTION OF THE INVENTION

Figure 1:
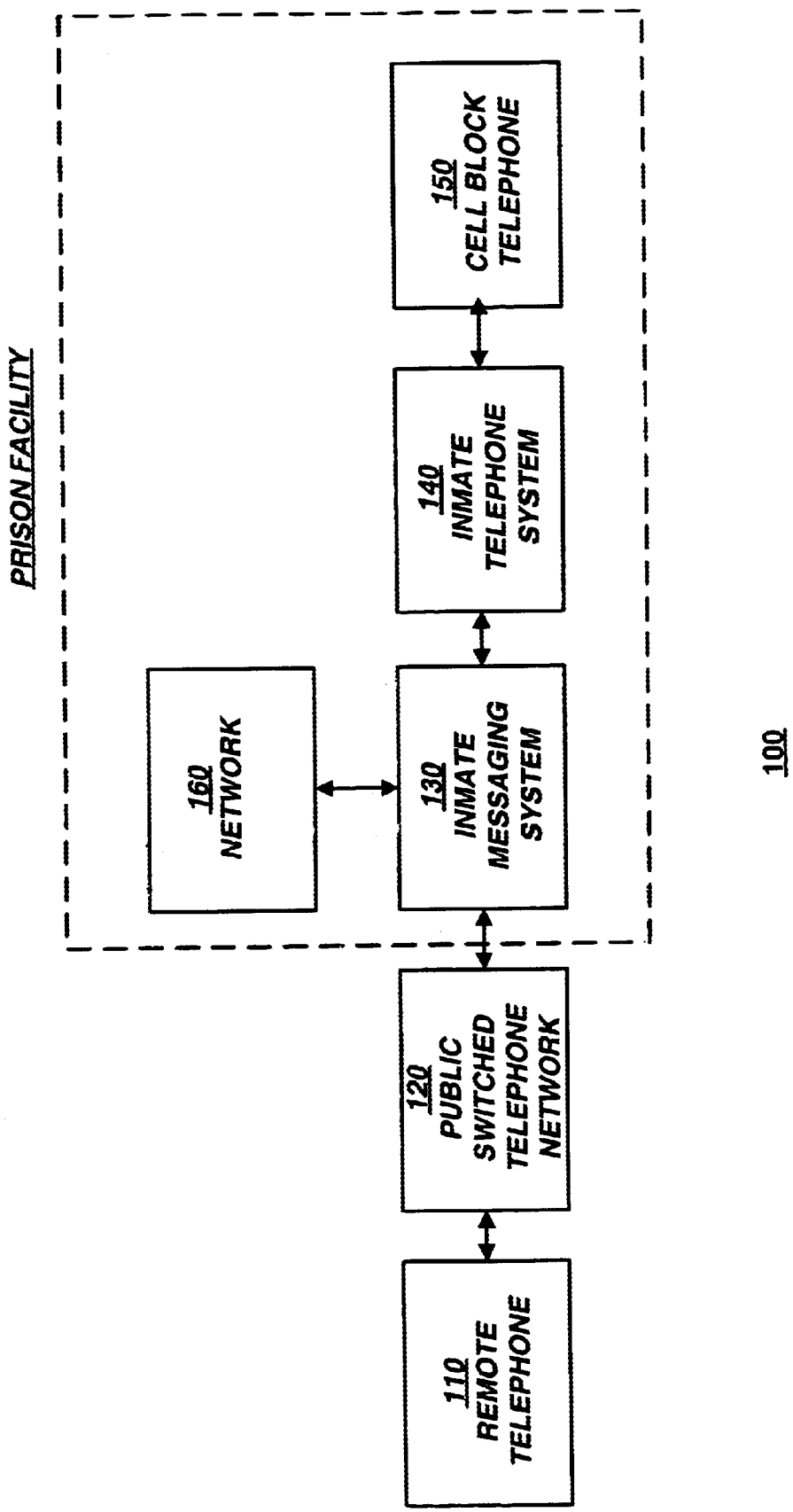
FIG. 1 is a functional block diagram of one embodiment of a telecommunication system 100 having an inmate messaging system 130 in accordance with the present invention.

Referring to FIG. 1, there is shown a functional block diagram of one embodiment of telecommunication system 100 having an inmate messaging system 130 in accordance with the present invention. Telecommunication system 100 includes remote telephone 110, Public Switched Telephone Network 120 ("PSTN"), inmate messaging system 130, inmate telephone system 140, cell block telephone 150, and computer network 160. Remote telephone 110 can be any telecommunication device including a touch-tone telephone, a cellular telephone, or a personal computer coupled to conventional telephone equipment via, for example, a Telephony Applications Programming Interface ("TAPI"). The term "remote," as used herein, means a telephone outside the prison facility.

Cell block telephone 150 can be, for example, a conventional touch-tone telephone. Typically, inmate paging system 130, inmate telephone system 140, cell block telephone 150, and network 160 are located within a single prison facility, as shown in FIG. 1.

Remote telephone 110 is coupled to PSTN 120; a worldwide public telephone network for providing voice connectivity. PSTN 120 is coupled to inmate messaging system 130, which is described in detail with respect to FIG. 2. Inmate messaging system 130 is coupled to inmate telephone system 140, which, in turn, is coupled to cell block telephone 150. Inmate telephone system 140 can be, for example, the system described in U.S. Pat. No. 5,535,261, entitled "Selectively Activated Integrated Real-time Recording Of Telephone Conversations." Alternatively, inmate messaging system 130 can be integrated into inmate telephone system 140.

The telecommunication system 100 described above provides voice connectivity between an remote caller and an inmate in a controlled prison environment. It is noted that telecommunication system 100 is but one embodiment of the present invention, and other embodiments are possible without departing from the spirit and scope of the present invention. For example, voice connectivity can also be implemented with the Integrated Services Digital Networks ("ISDN"), or any other communication medium that can transfer speech signals.

Figure 2A:
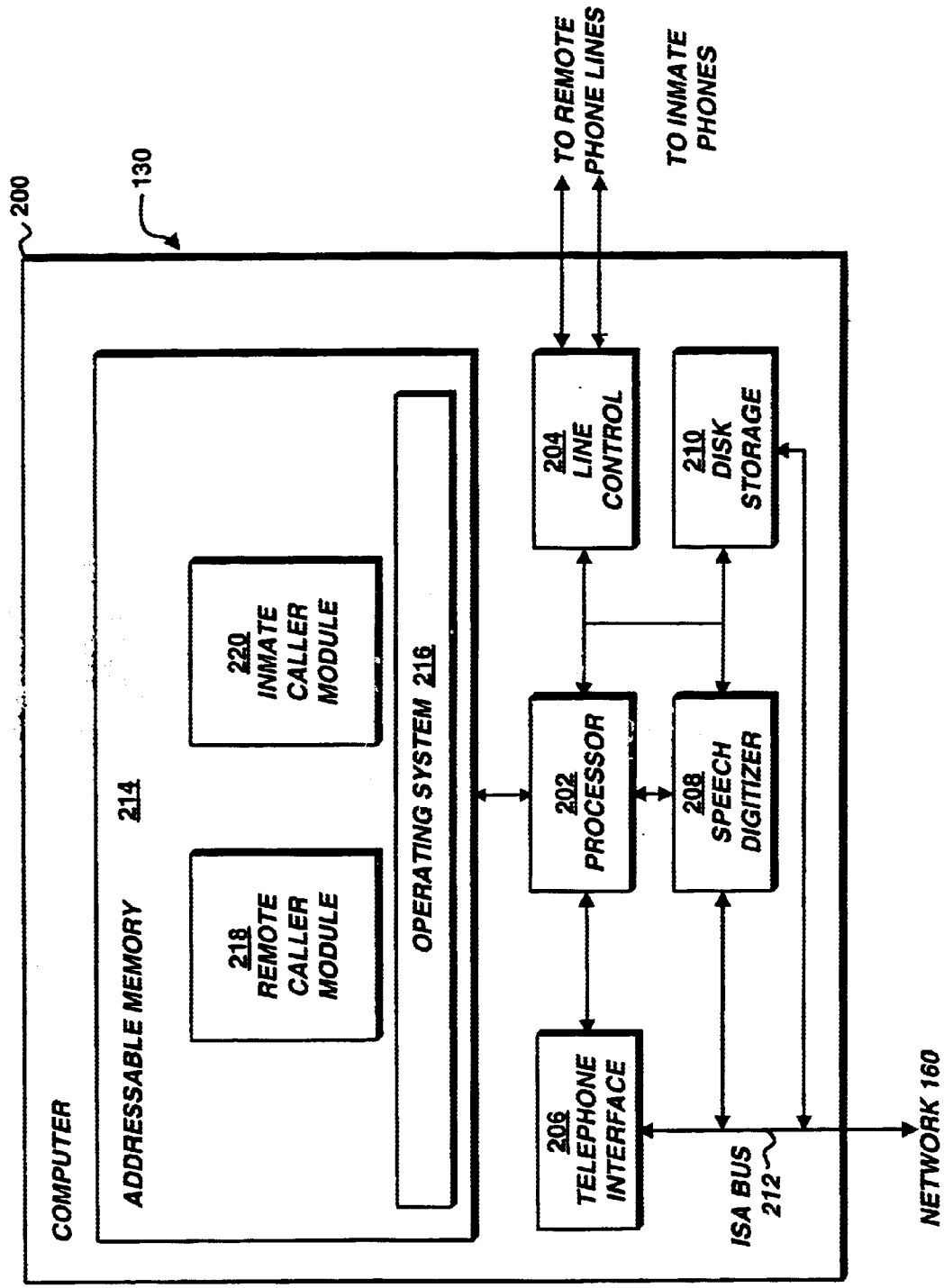
FIG. 2A is a functional block diagram of one embodiment of the inmate messaging system 130 in FIG. 1 in accordance with the present invention.

Referring to FIG. 2A, there is shown a functional block diagram of one embodiment of inmate messaging system 130 in FIG. 1 in accordance with the present invention. Inmate messaging system 130 (hereinafter also referred to as "system 130") includes a conventional computer 200 coupled to telephone interface card 206 and speech digitizer card 208. Such cards are available from companies such as Dialogic, Rhetorex, and PIKA. Cards 206 and 208 are coupled to disk storage 210, and (if desired) network 160 via a conventional bus 212, such as an Industry Standard Architecture ("ISA") or Peripheral Component Interconnect ("PCI") bus. System 130 also includes line control cards 204 for providing switching and access control for remote telephone lines and for cell block telephones connected to system 130. Cards 206 and 208 are connected to processor 202 via conventional bus 212.

Computer 200 includes processor 202 for running software program instructions stored in disk storage 210. These instructions direct processor 202 to perform the various functions of system 130. Addressable memory 214 is used as a workspace for performing program instructions and other functions for operating system 216, remote caller module 218, and inmate caller module 220. Operating system 216 performs conventional computer system services for communicating with, for example, cards 206 and 208. Remote caller module 218 is a set of software program instructions for managing telephone calls from remote callers, and for managing account information for remote caller accounts. Inmate call module 220 is a set of software instructions for managing telephone calls with inmate callers, and for providing access to the messages from remote callers. A messaging service operator can interact with the inmate messaging system 130 via computer network 160.

In the preferred embodiment described herein, the hardware elements of computer 200 are conventional components of a personal computer or workstation. The inventive aspects of the present invention lie primarily in the modules 218 and 220, in the manner in which they configure and control the hardware elements shown in FIG. 2A.

Figure 2B:
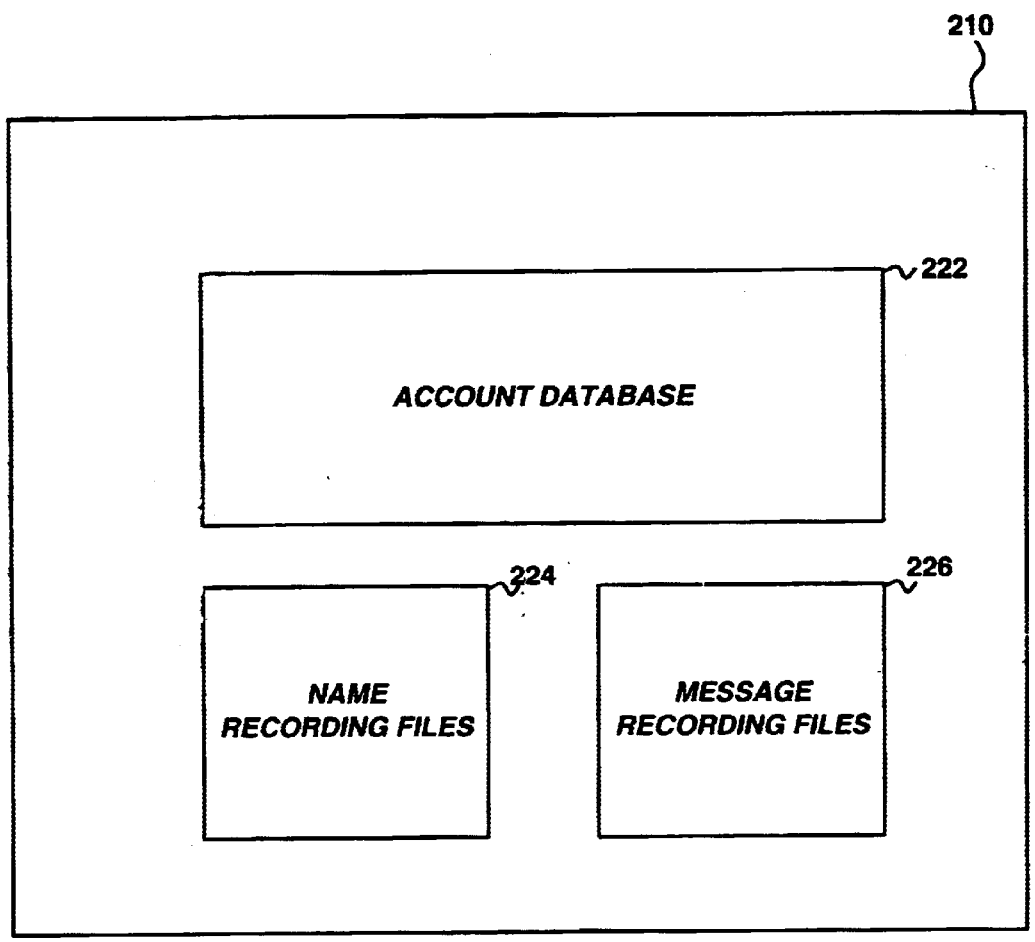
FIG. 2B is a functional block diagram of one embodiment of an account database and recording files used by inmate messaging system 130 in accordance with the present invention.

Referring to FIG. 2B, there is shown a functional block diagram of one embodiment of account database 222, name recording files 224, and message recording files 226 in accordance with the present invention. Preferably, account database 222 and recording files 224 and 226 are located in disk storage 210. These data structures, however, can also reside in remote locations outside the prison facility, where they can be accessed by system 130 through, for example, network 160.

Each of the name recording files 224 stores a digitized recording of the name of a registered account owner in account database 222. Name recording files 224 also include header portions that include an account number and PIN for associating the name recording files 224 with the appropriate account. Preferably, the name recordings are generated using methods described below with respect to FIGS. 5 and 6.

Each of the message recording files 226 stores digitized messages from remote callers, which are converted into an analog signal before being played back to one or more designated inmates using conventional techniques. Like name recording files 224, each of the message recording files 226 includes a header portion that includes the account number and PIN for associating the message recording file 226 with the appropriate account.

Account database 222 includes a call detail record for each telephone call received or placed by remote callers or inmate callers, as described below with respect to FIG. 2C. Account database 222 also includes a list of account numbers and PINs, each of which are associated with an account. If a remote caller or inmate enters an account number and PIN, these numbers are compared against the numbers stored in account database 222 to determine their validity. The list of account numbers and PINs can be manually set-up by an inmate messaging service operator by taking the appropriate information over the telephone, via regular mail, or through a web site.

Additionally, each account in the account database 222 includes an active list of inmates that may be contacted by a remote caller for that account, and a cell block number identifying the cell block housing the inmate. If an inmate is not on the active list, system 130 will not connect the call or record a message for the inmate. Preferably, the active list includes a cell block telephone number, which is updated regularly by, for example, a system administrator to account for the release or transfer of inmates, or any other events that warrant an update. In one embodiment, the cell block telephone number can be compared against a cell block telephone number entered by the remote caller when attempting to leave a message for an inmate. This prevents a remote caller from calling cell blocks that do not house inmates on the caller's active list. If the cell block telephone number cannot be matched, the remote caller can call the prison facility to determine where the inmate is currently housed.

Referring to FIG. 2C, there is shown an illustration of one embodiment of a call detail record 228 ("CDR 228") in accordance with the present invention. Inmate messaging system 130 generates and updates a CDR 228 for each call received or placed by a remote caller or inmate. Each CDR 228 includes a plurality of data fields. Each field belongs to at least one of three categories: account information, message information, or inmate information, as illustrated in FIG. 2C. Preferably, account information includes: account number, PIN, account status, name, address, and telephone number. The account number can be, for example, a unique twelve digit number for identifying and indexing a specific account in database 222. The PIN number is, for example, a unique four to six digit number for preventing unauthorized access to information stored in the remote caller's account. The account number is first entered into system 130, followed by the PIN number. Both numbers are entered into system 130 by the remote caller by pressing the appropriate buttons on a touch-tone telephone in response to audio prompts. Alternatively, voice recognition techniques can be employed, either independently or in combination with an account number and PIN.

The account status field is used to indicate the status of the account. For example, the account status field can be used to indicate whether an account is active or inactive. An inactive account can be, for example, a new account or an account that has been suspended for delinquent payments, or for violation of prison rules and/or policies.

Additionally, the CDR 228 includes the remote caller's name, address, and telephone number. There can be separate fields for the caller's home residence and business address. Other fields may also be added to CDR 228, such as an email address, or a social security number and/or date of birth for security purposes.

Message information preferably includes: date of message, time of message, call back time, message status, and a message counter. If a call is received by inmate messaging system 130, the date and time of the call is recorded in CDR 228. The time can be store in either standard time or military time. If standard time, the time will be marked as A.M. or P.M., where appropriate.

The call back time is an optional field specified by the remote caller during a call session. The call back time is the time that the remote caller would like the inmate to return the call. The call back time can be a single discrete time or a time range (e.g., 1:00 PM to 2:00 PM).

Message status reflects the status of the message left by the remote caller. For example, the message status can indicate whether the inmate took the call or refused the call. The message status provides an advantage by enabling the remote caller to determine whether or not a message was actually received by an inmate. Without the message status field, a remote caller could not determine whether the inmate telephone system 140 failed, or whether the inmate refused the call.

Figure 8:
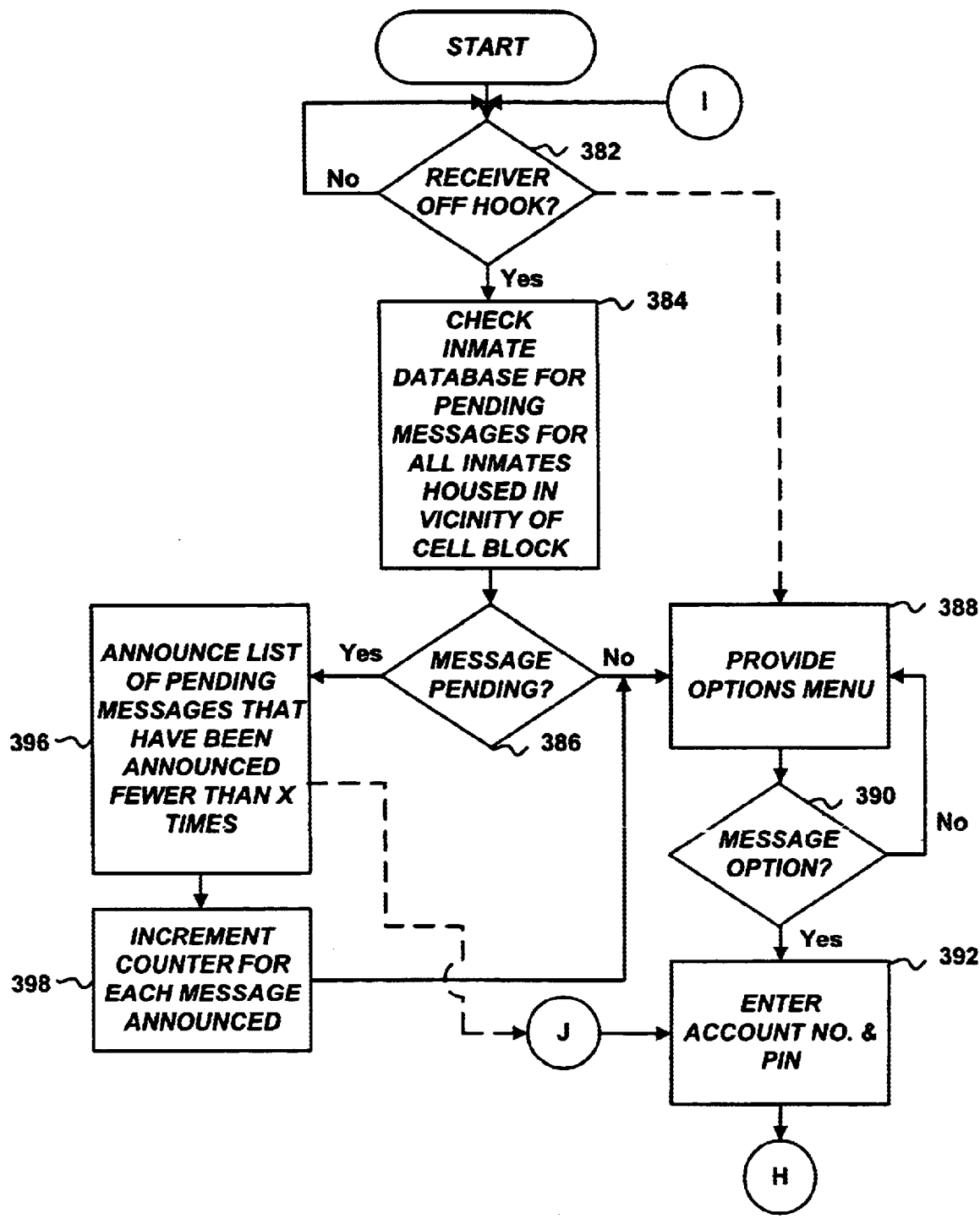
FIG. 8 is a flow diagram of one embodiment of an inmate message announcement method in accordance with the present invention.

A message counter field is also included in CDR 228 to provide a count of the number of times a message has been announced, as described in further detail with respect to FIG. 8.

Inmate information preferably includes: account number, PIN, name, inmate number, and cell block telephone number. The account number and PIN for the inmate can be the same as or different from the account number and PIN listed under account information in FIG. 2C. The name and inmate number are used to identify the inmate. The cell block telephone number is used to connect to a particular telephone in a particular cell block in the prison facility. The cell block telephone number is used by system 130 to deliver messages to the appropriate cell block, as indicated by the cell block number field in CDR 228.

An advantage of using CDR 228 is the ability to automatically document pertinent accounting information during a call. For example, the information contained in the CDR 228 (e.g., name, address) can be used for billing purposes. This information provides economic benefits by allowing the system to allocate costs to the remote caller, rather than have the prison facility absorb the costs at taxpayers' expense.

Having described the inmate messaging system 130 in detail, the operation of the inmate messaging system 130 will now be described below. To facilitate the reader's understanding of the operation of present invention, the present invention will be described first from the perspective of a remote caller (hereinafter also referred to as the "remote caller side") and, secondly, from the perspective of an inmate caller (hereinafter also referred to as "the inmate caller side"). The description that follows may include audio messages that the inmate messaging system 130 plays for the remote caller and the inmate caller. It is noted that the scope of the present invention is not limited to the specific messages described herein, and that other messages are possible without departing from the spirit and scope of the present invention.

Remote Caller Side

In the preferred embodiment, the steps described below are implemented in software by remote caller module 218, as shown in FIG. 2A.

Figure 3:
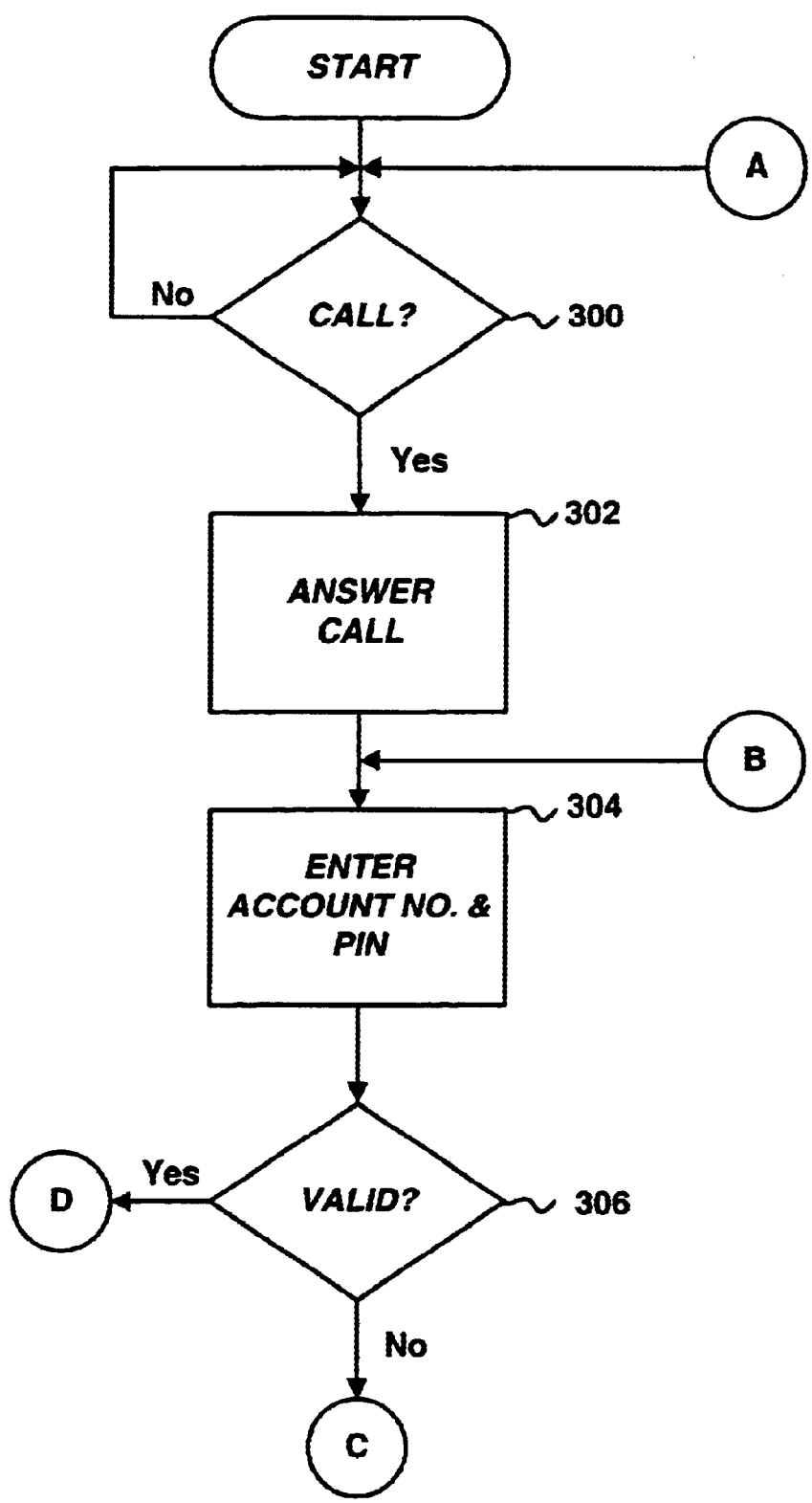
FIG. 3 is a flow diagram of one embodiment of a call answer and verification method in accordance with the present invention.

Referring to FIG. 3, there is shown a flow diagram of one embodiment of a call detection and verification method in accordance with the present invention. System 130 is coupled to receive telephone calls initiated from remote callers, i.e., callers from outside the prison facility. If 300 a call is received, system 130 answers 302 the call and plays a recorded greeting, identifying the prison facility to let the caller determine whether they dialed the correct number. Thereafter, system 130 prompts 304 the remote caller to enter an account number and PIN. The remote caller then presses the appropriate keys on their telephone to enter the account number and PIN. When finished, the remote caller can signal system 130 by pressing, for example, the pound sign (i.e., "#"). Upon pressing the pound sign, system 130 proceeds to call an input function (not shown) for receiving and error checking the numbers entered by the remote caller against the account database 222. The input function provides conventional range and type checking on the numbers before cross-referencing the numbers with account database 922. If 306 one or both numbers are invalid, the method continues as described with respect to FIG. 4. Otherwise, the method continues as described with respect to FIG. 6. To determine whether or not a number is invalid, system 130 compares the entered numbers with numbers stored in account database 222, as described with respect to FIG. 2B.

If a remote caller is using system 130 for the first time, the remote caller will enter a temporary PIN issued by the messaging service operator over the telephone, via regular mail, or through a web site. In step 306, system 130 will identify the temporary PIN as invalid, and transfer control to step 308, as described below with respect to FIG. 4.

Figure 4:
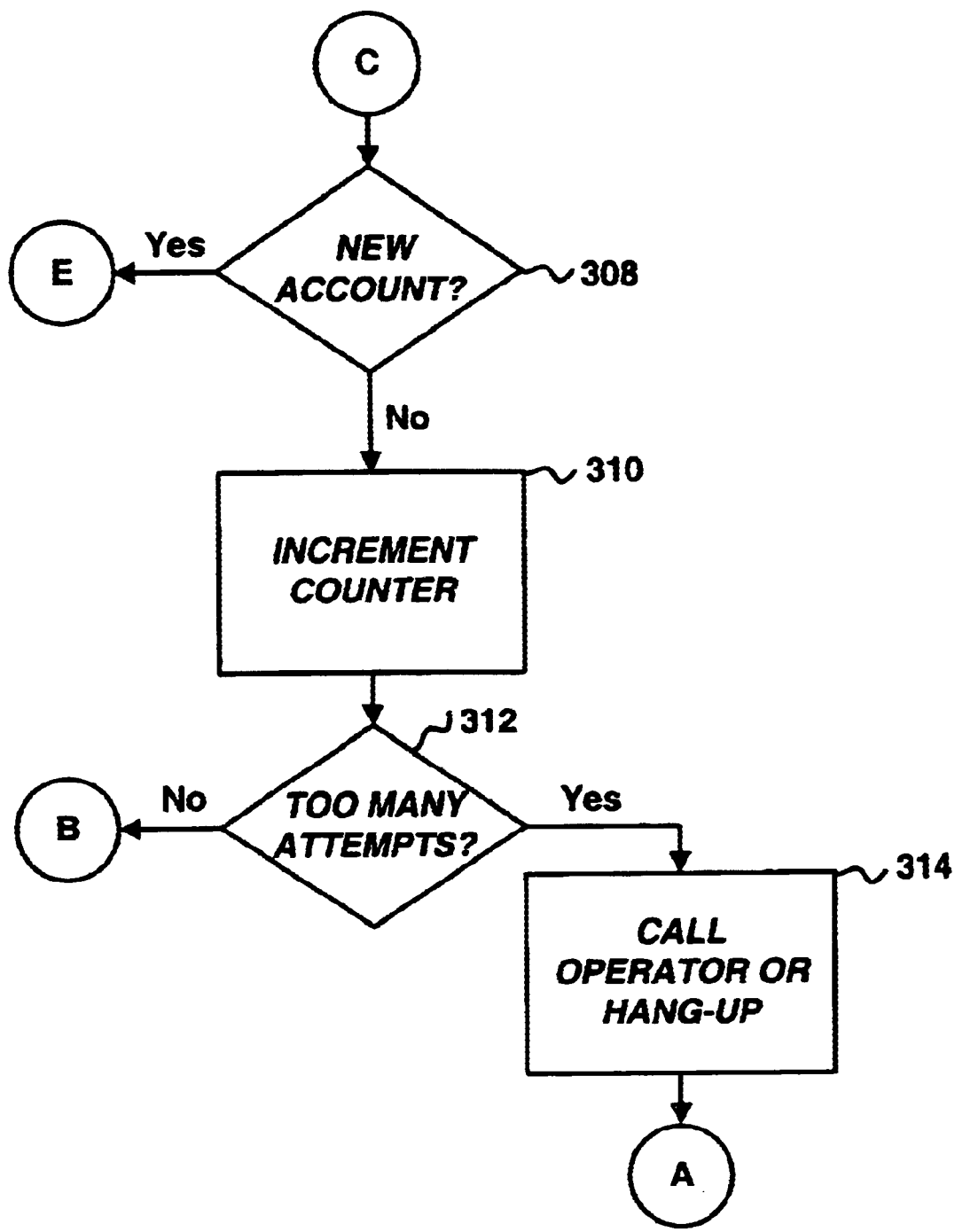
FIG. 4 is a flow diagram of one embodiment of a new account verification method in accordance with the present invention.

Referring to FIG. 4, there is shown one embodiment of a new account verification method in accordance with the present invention. If 308 the account is a new account, the method continues as described with respect to FIG. 5. A new account is identified by matching its temporary PIN with a list of temporary PINs in account database 222. Otherwise, system 130 informs the remote caller of the problem and increments 310 a counter. If the PIN is not a temporary PIN or the account number is not in the account database 222, system 130 assumes that the entry is invalid. An account number or a PIN can be invalid because the input function detected a range or type error, or because an incorrect number was inadvertently entered. If 312 the remote caller makes too many attempts at entering the account number and/or PIN, system 130 blocks further access to the system and prompts the remote caller to either call the operator for assistance (e.g., by pressing 0), or hang-up and try again later. Thus, the system allows the remote caller a finite number of attempts (e.g., 5) to enter an account number and PIN. If 312 the number of attempts is not exceeded, the inmate messaging system 130 asks the remote caller to try again, then returns to step 304 to receive another input.

An advantage of limiting the number of attempts for entering an account number and PIN is that remote callers are prevented from finding a valid account number and PIN through trial and error, thus exploiting the inmate messaging 130 system to their gain or advantage.

If the caller chooses to hang-up, the inmate messaging system 130 calls a clean-up function and returns control to step 300, as shown in FIG. 3. The cleanup function occurs each time a call session is terminated. The clean-up function prepares system 130 for receiving another call by, for example, resetting counters, updating and closing files, and resetting name and message recordings. Hereinafter, each time the system 130 terminates a call or session, it is presumed that the clean-up function is performed as described above.

Figure 5:
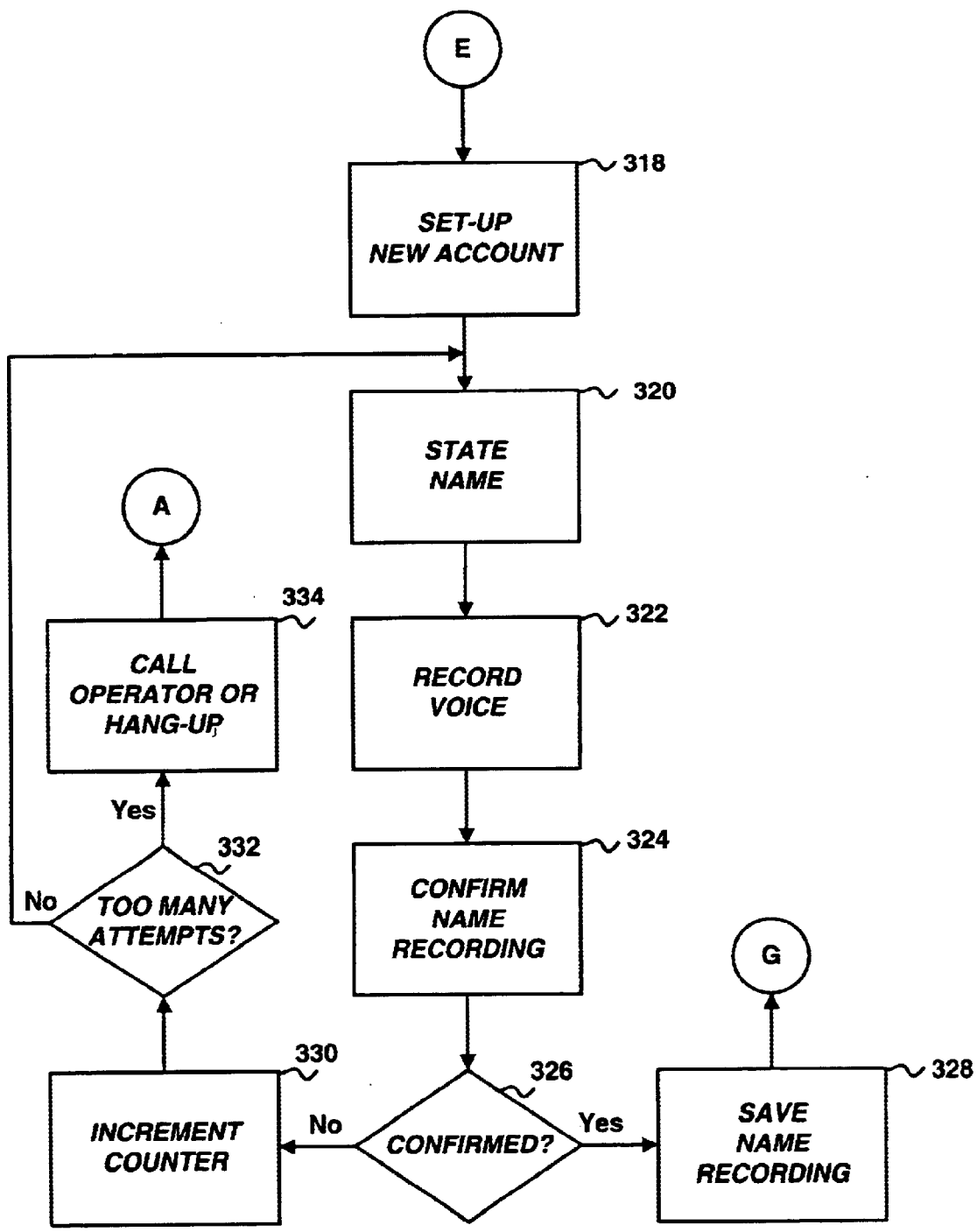
FIG. 5 is a flow diagram of one embodiment of a new account set-up session in accordance with the present invention.

Referring to FIG. 5, there is shown a flow diagram of one embodiment of a new account set-up session in accordance with the present invention. In response to a new account number, inmate messaging system 130 sets-up 318 a new account. Preferably, this includes activating the account number and PIN and initiating a name recording procedure, as described below. Once activated the account status field is updated to reflect the active status of the message account.

System 130 begins the name recording procedure by prompting the remote caller to state 320 their name after a beep tone. After the beep tone, system 130 digitally records 322 the remote caller's voice and temporarily stores the digitized recording in addressable memory 214 (FIG. 2A). After recording the remote caller's voice, the inmate messaging system 130 asks the remote caller to confirm 324 the voice recording by replaying the recording for the remote caller. This procedure allows the remote caller to hear the name recording to determine whether it was recorded properly (e.g., good clarity, annunciation, voice inflection, etc.). If 326 the name recording is confirmed by the remote caller (e.g., by pressing an appropriate key on the telephone), the name recording is saved 328 to a name recording file 224 in disk storage 210, and the method proceeds to step 342, as described below with respect to FIG. 6.

If 326 the name recording is not confirmed by the remote caller, system 130 informs the remote caller of the problem and increments 330 a counter. If not too many attempts 332 have been made, system 130 returns to step 320 to make another attempt at a name recording. Otherwise, system 130 requests the remote caller to either call 334 an operator for assistance or hang-up and try again later. If the caller chooses to hang-up, the inmate messaging system 130 calls a clean-up function and returns control to step 300, as shown in FIG. 3.

The name recording procedure described above is advantageous because it allows accounts to be identified by name recordings instead of account numbers and PINs, which can be difficult to remember.

Figure 6:
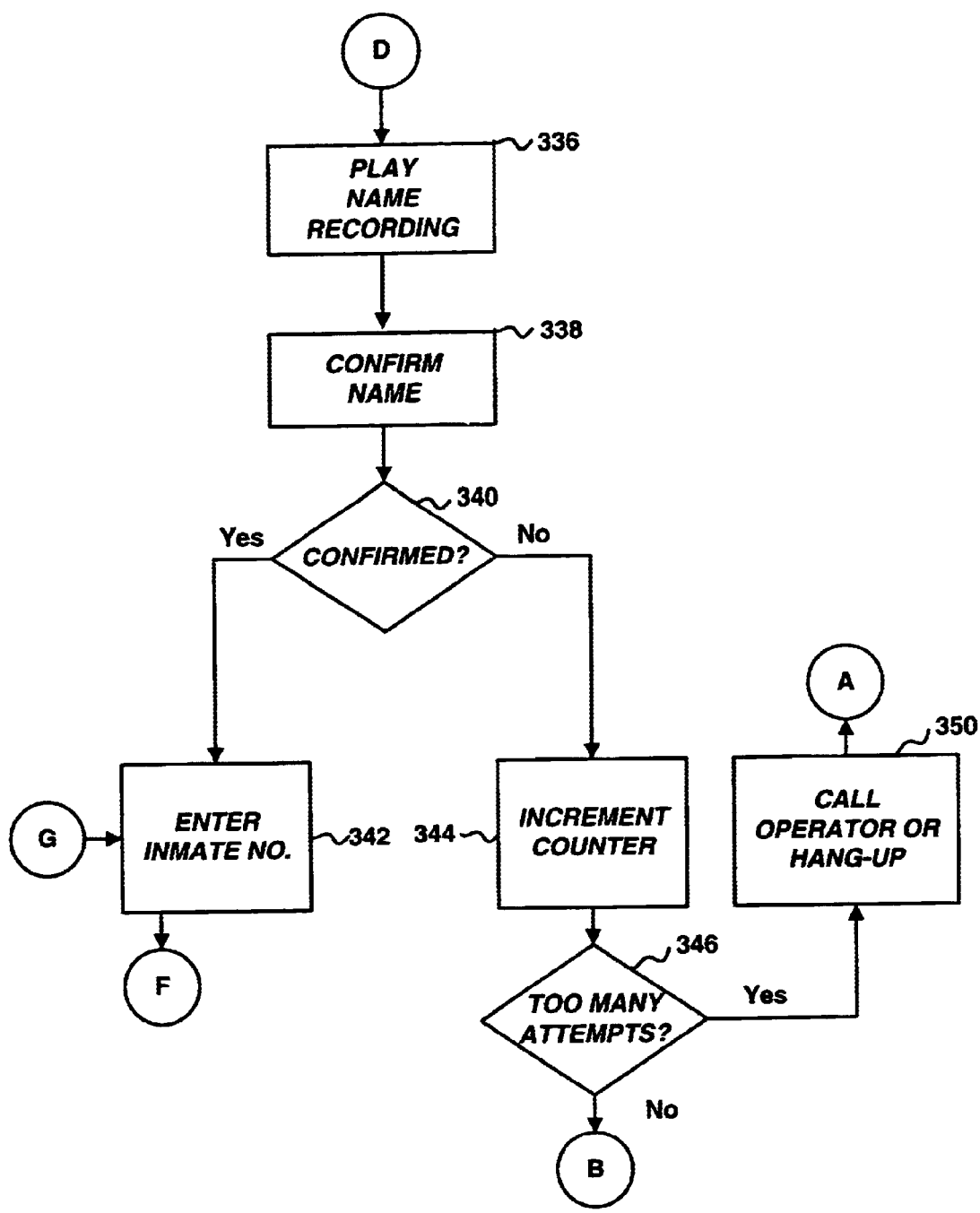
FIG. 6 is a flow diagram of one embodiment of an account confirmation and inmate specification method in accordance with the present invention.

Referring to FIG. 6, is a flow diagram of one embodiment of an account confirmation and inmate specification method in accordance with the present invention. System 130 retrieves the name recording associated with the account number and PIN entered in step 304, and plays 336 the name recording for the remote caller. System 130 then asks the remote caller to confirm 338 the account name by pressing an appropriate key (e.g., by pressing the "1" key). If 340 the account name is confirmed by the remote caller, system 130 prompts the remote caller to enter 342 an inmate number, followed by the pound sign to signal when finished entering the numbers. Each inmate in the prison facility is assigned a unique inmate number, which is used by the prison facility to identify the inmate. Preferably, a list of inmate numbers is stored in account database 222 for comparing with the inmate number entered by the remote caller in step 342.

If 340 the inmate number is not confirmed 340 by the remote caller, system 130 increments 344 a counter. If 346 too many attempts have been made, the system 130 requests the remote caller to either call 350 the operator for assistance or hang-up and try again later. If the caller chooses to hang-up, system 130 calls a clean-up function and returns control to step 300, as shown in FIG. 3. If 346 not too many attempts have been made, system 130 returns to step 304 to receive another input, as described with respect to FIG. 3.

Figure 7:
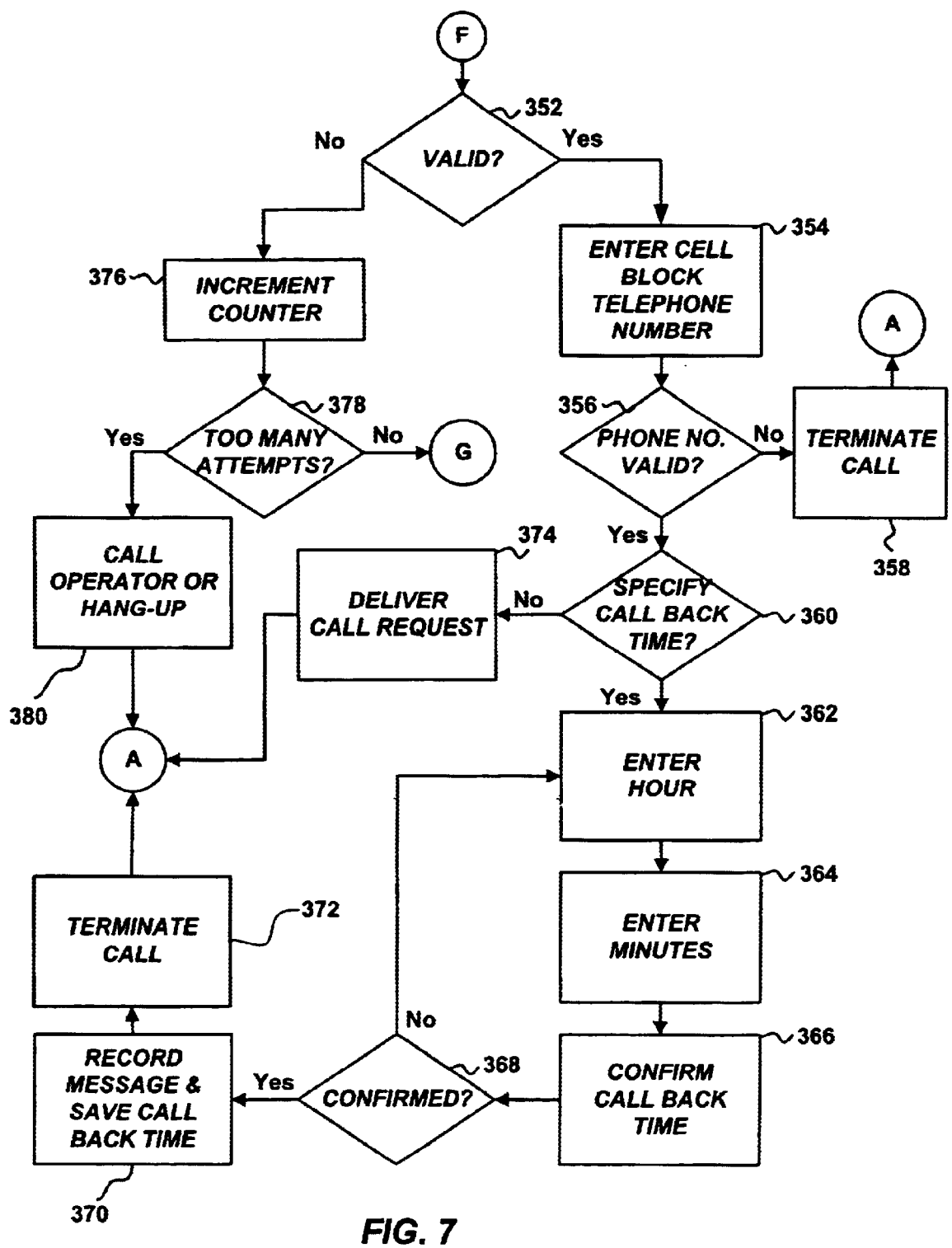
FIG. 7 is a flow diagram of one embodiment of a cell block telephone number confirmation and call back time specification method in accordance with the present invention.

Referring to FIG. 7, there is shown a flow diagram of one embodiment of a cell block telephone number confirmation and call back time specification method in accordance with the present invention. After the remote caller enters 342 the inmate number, system 130 calls an input function to check for range and type errors. If the number is successfully entered, system 130 compares the number to an active list of inmate numbers in database 222 (FIG. 2B). If 352 the entered number is not valid (e.g., no match), the remote caller is informed of the problem, and system 130 increments 376 a counter. If 378 too many attempts have been made, system 130 requests that the remote caller either call 380 the operator for assistance or hang-up and try again later. The system 130 then terminates the call and returns to step 300, as shown in FIG. 3. If 378 not too many attempts to enter an inmate number have been made, system 130 returns to step 342 to receive another input, as shown in FIG. 6.

If 352 the inmate number is valid (e.g., match found), the system 130 prompts the remote caller to enter 354 a cell block telephone number. If 356 the cell block number telephone number is invalid (e.g., the cell block telephone number does not correspond to an inmate on the active list of inmates for the account), system 130 terminates the call, calls a clean-up function, then returns control to step 300, as shown in FIG. 3. If 356 the cell block telephone number is valid (e.g., the cell block telephone number corresponds to an inmate on the active list of inmates for the account), system 130 asks the remote caller if they would like to specify a call back time (e.g., a time for the inmate to return the call). If 360 the remote caller wants to specify a call back time (e.g., by pressing the pound key), the system 130 proceeds to prompt the remote call to first enter 362 an hour and then enter 364 minutes, thus establishing a call back time. The call back time can be entered in either standard or military time formats. If the standard time format is used, the system 130 will also prompt the caller to designate A.M. or P.M., where appropriate. Additionally, the call back time can be entered as a discrete time or as a time range.

After the remote caller successfully enters the call back time, the system 130 confirms 366 the time by providing an audio feedback of the time to the remote caller. If 368 the call back time is not confirmed, the system 130 returns to step 362 to receive another input. Otherwise, the system 130 proceeds to record 370 a message from the remote caller, if any, and save the call back time in CDR 228 located in account database 222 (FIG. 2C). After saving the message and the call back time, system 130 terminates 372 the call, executes a clean-up function, then proceeds to step 300, as shown in FIG. 3.

An advantage exists in allowing the remote caller to specify a time for the inmate to return the call. By specifying a time for the inmate to call, problems associated with the remote caller not being able to take an inmate's return call (e.g., logistics, costs) can be reduced by providing the inmate with a specific time or time range for calling back the remote caller.

If 360 the remote caller does not wish to specify a call back time, the system 130 delivers 374 the call request by automatically dialing the cell block telephone number in the cell block where the inmate is housed. If a connection is established with the cell block telephone 150, the system 130 returns to step 300 to receive the next call. If no connection is made, the system 130 informs the remote caller of the situation, asks the remote caller to try again later, terminates the call, executes a clean-up function, and returns to step 300, as shown in FIG. 3.

Having described the preferred embodiment of the remote caller side of the present invention, the inmate caller side of the inmate messaging system 130 will now be described.

Inmate Caller Side

In the preferred embodiment, the methods described below are implemented in software by the inmate caller module 220 (FIG. 2A).

Referring to FIG. 8, there is shown a flow diagram of one embodiment of an inmate message announcement method in accordance with the present invention. If 382 an inmate lifts the cell block telephone 150 receiver off its hook, system 130 checks 384 account database 222 for pending messages for all inmates located within the vicinity of the cell block telephone 150, which can be all or part of a prison cell block. Preferably, if the inmate lifts the cell block telephone 150 receiver off its hook, a signal is sent from the cell block telephone 150 to system 130 to notify system 130 that an inmate would like to check for messages. This signal is also used by system 130 to identify the cell block telephone for purposes of message delivery.

If 386 any messages are pending, the system 130 will announce 396 a list of the messages over the cell block telephone 150. Preferably, the list includes messages for all inmates within the cell block, thus precluding each inmate from having to individually check for a list of their own messages. Each message in database 222 is associated with a CDR 228, which includes a cell block number field that is used by system 130 to deliver pending messages to the appropriate cell block telephone 150. Each CDR 228 also has a message counter field which is incremented 398 each time a message in the message list is announced. System 130 will only announce 396 the pending messages that have been announced fewer than a predetermined number times (e.g., five times). This will prevent an overload of pending messages which could take a long time to announce. During the announcement of the list of pending messages, the inmate can press a key (e.g., the pound key) at any time to stop the announcement and access their own messages. After the list of pending messages is announced, the system provides 388 an audio menu of options. The options allow an inmate to, for example, retrieve messages, leave messages for others, make a call, access a help menu, or connect to an operator. Alternatively, if 382 an inmate lifts the receiver off its hook, the system 130 immediately provides 388 the audio menu of options to the inmate, thus skipping steps 384, 386, 396, and 398.

If 390 the inmate selects a messaging function from the menu of options, system 130 prompts the inmate to enter 392 an account number and PIN. System 130 then calls an input function to perform range and type checking on the entered numbers. If the numbers are accepted by the input function, the method continues as described with respect to FIG. 9.

Figure 9:
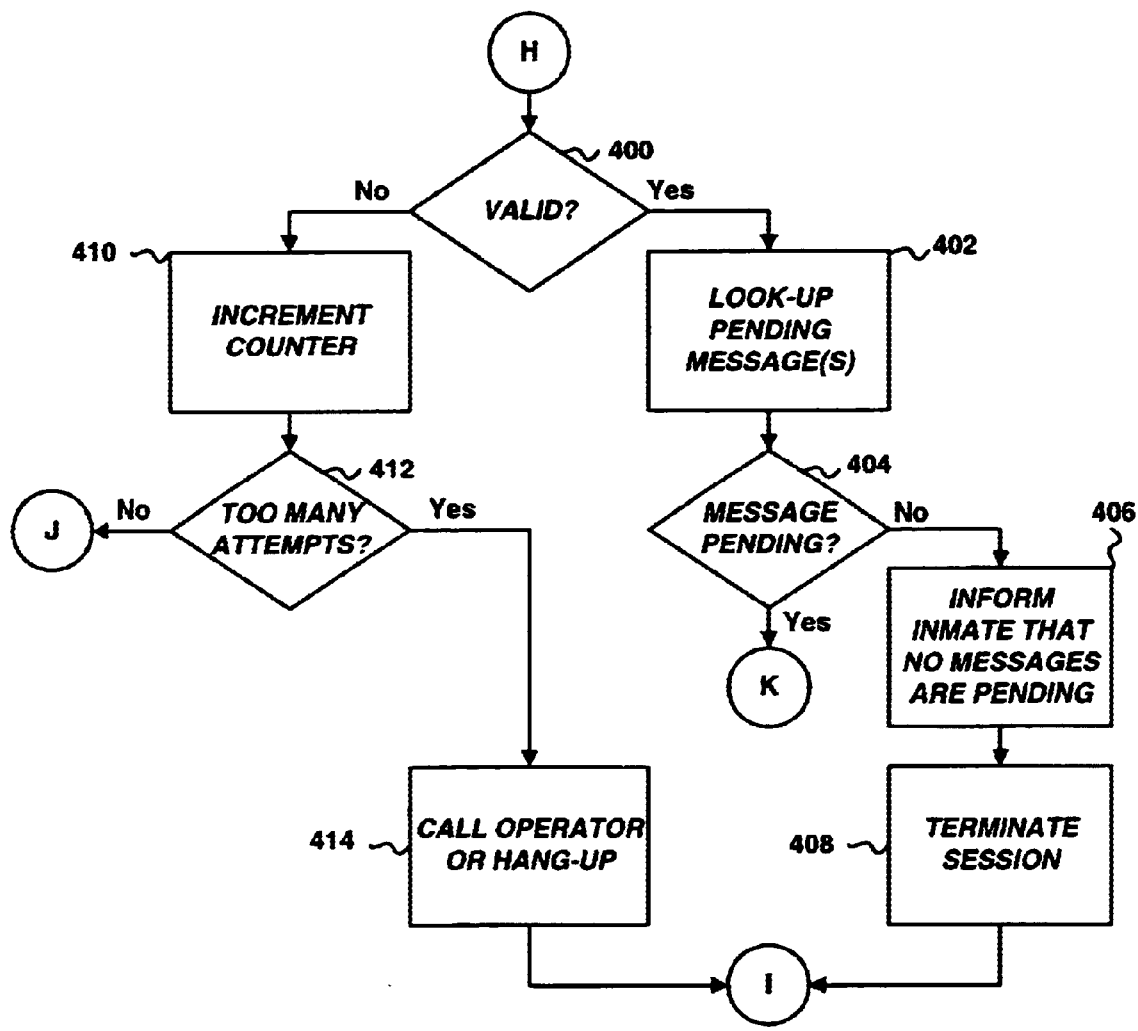
FIG. 9 is a flow diagram of one embodiment of an inmate message playback method in accordance with the present invention.

Referring to FIG. 9, there is shown a flow diagram of one embodiment of an inmate message playback method in accordance with the present invention. If 400 the account number and PIN are valid, the system 130 looks-up 402 the inmate's messages in account database 222. If 404 no messages are pending for the inmate, the system 130 informs 406 the inmate that no messages were found, the system 130 terminates 408 the call session, executes a clean-up function, and returns to step 382, as shown in FIG. 8. If 400 the account number or PIN is not valid, system 130 increments 410 a counter. If 412 too many attempts have been made, the inmate is requested to either call the operator for assistance or hang-up and try again later. If 412 not to many attempts have been made, the system 130 returns to step 392 to receive another input, as described with respect to FIG. 8. If 404 one or more messages are pending for the inmate, the system 130 continues to step 416, as described with respect to FIG. 10.

Figure 10:
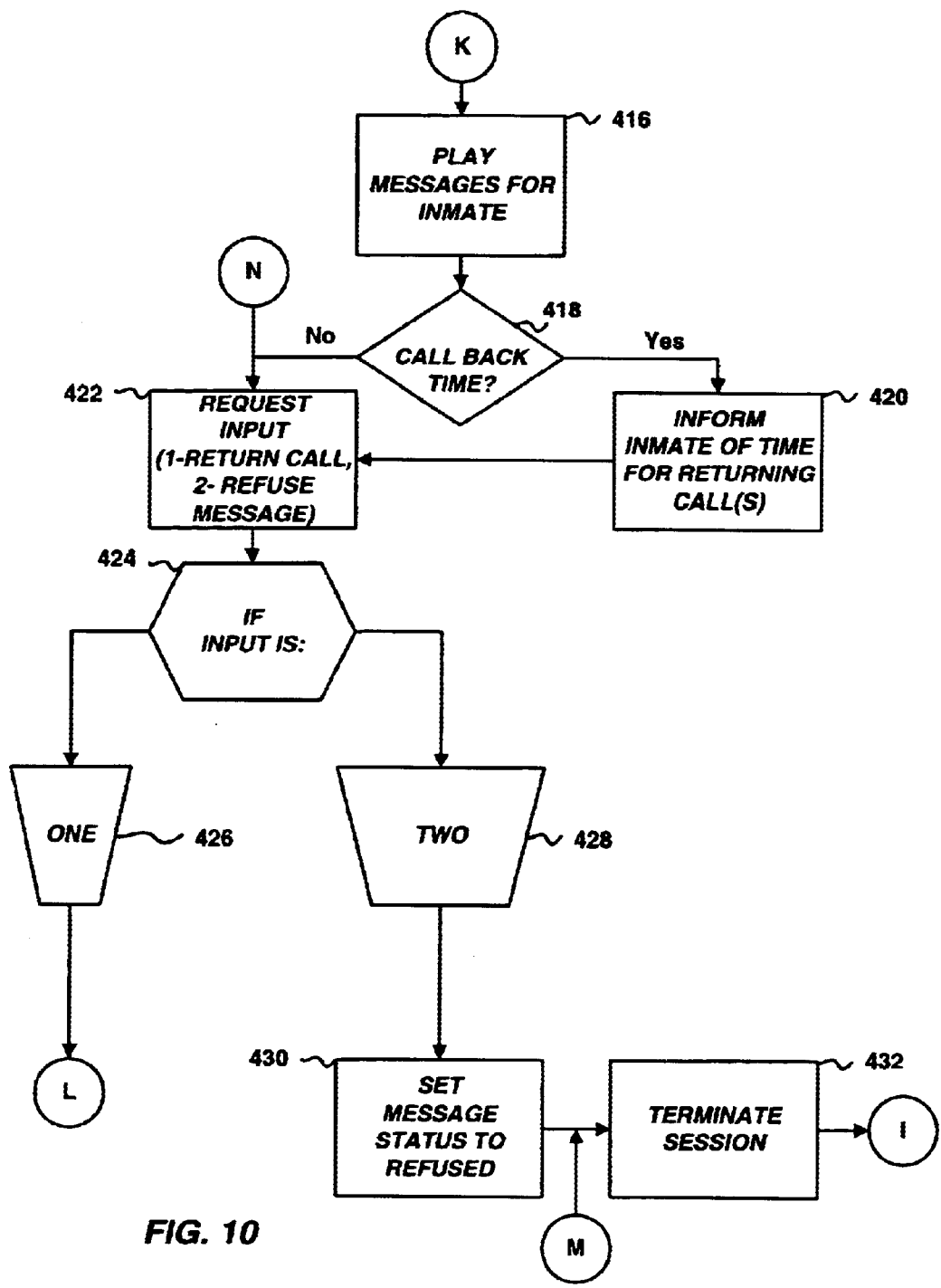
FIG. 10 is a flow diagram of one embodiment of an inmate call back and message status method in accordance with the present invention.

Referring to FIG. 10, there is shown a flow diagram of one embodiment of an inmate call back and message status method in accordance with the present invention. If 404 one or more messages are pending for the inmate, system 130 plays 416 each message(s) for the inmate in, for example, chronological order. The inmate is provided with several options at step 416, which includes, for example, stopping, rewinding, or skipping the message. If 418 the remote caller specified a call back time in step 360 (FIG. 7), system 130 informs 420 the inmate of the call back time for each message, where appropriate. If 418 no call back time was specified or after the inmate is informed 420 of any call back time, system 130 requests 422 the inmate to: 1) immediately return the call, or 2) refuse the message. If 424 the inmate enters 426 "1," the system 130 proceeds to place the call, as described in detail with respect to FIG. 11. Otherwise, if 424 the inmate enters 428 "2," system 130 sets 430 the message status field in CDR 228 (FIG. 2C) to "refused," executes a clean-up function, and terminates 432 the session. Alternatively, the inmate is given the option to delete the message after it has been refused.

The message status field in CDR 228 provides an advantage by enabling the remote caller to determine whether or not a message was actually received by an inmate. Without the message status field, a remote caller could not determine whether the inmate telephone system 140 failed, or whether the inmate refused the call.

Figure 11:
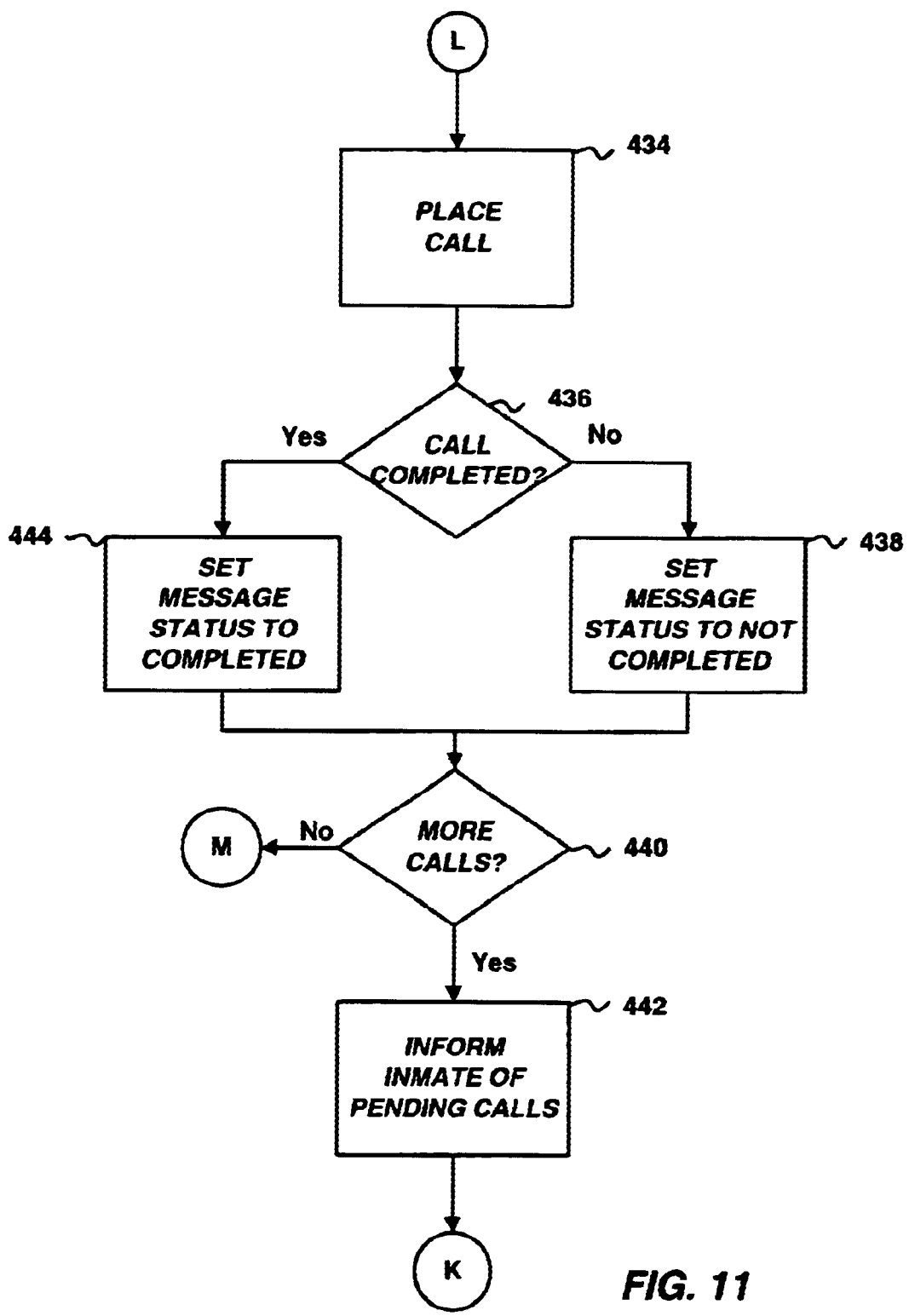
FIG. 11 is a flow diagram of one embodiment of an inmate call back and message status method in accordance with the present invention.

Referring to FIG. 11, there is shown a flow diagram of one embodiment of an inmate call back and message status method in accordance with the present invention. If 424 the inmate enters 426 "1," system 130 places 434 a call for the inmate. If 436 the call is completed, system 130 sets 444 the messages status field in CDR 28 to "complete." A call is complete if the call is successfully connected with the remote caller. If 436 the call is not completed, system 130 sets 438 the message status field to "incomplete." After setting the message status field, system 130 determines if 440 there are messages still pending. If 440 there are more messages, system 130 informs 442 the inmate that there are more messages, then returns to step 416 to hear the next message, as previously described with respect to FIG. 10. If 440 there are no more messages, system 130 terminates 432 the session, as described with respect to FIG. 10.

Although the present invention has been described in considerable detail with reference to certain preferred embodiments thereof, other embodiments are possible. For example, the present invention can be used in other environments that typically require a carefully controlled messaging system, such as a military facility. Thus, the scope of the present invention, as defined by the appended claims, should not be limited to the description of the preferred embodiments herein.

What is claimed is:

1. A computer-implemented method of notifying an inmate in a prison facility of messages received from an external caller outside the prison facility, comprising:

storing a plurality of caller accounts, each caller account associated with an external caller and with a list of inmates allowed to receive a message from the external caller, wherein the external caller initiates generation of the caller account;

receiving account information from an external caller in response to a request for account information;

comparing the account information with information stored in the caller account to determine whether the caller account is valid;

receiving inmate information from the external caller in response to requests for inmate information;

comparing the inmate information with known information stored in the caller account to determine whether the inmate is on the list of inmates allowed to receive messages from the external caller;

recording a message from the external caller in response to a request from the external caller to leave a message; and storing the message in a file associated with the account information for future retrieval by the inmate.

2. The method of claim of 1, further comprising:

prompting the external caller to state his name;

recording the voice of the external caller as the external caller states his name;

digitizing the recording; and storing the recording in a file associated with the account information.

3. The method of claim 2, further comprising:

playing the recording for the external caller;

prompting the external caller to confirm the recording; and receiving a response from the external caller indicating that the external caller confirms the recording.

4. The method of claim 2, further comprising:

preventing the external caller from making more than a predetermined number of attempts to record the voice of the external caller.

5. The method of claim of 1, further comprising:

prompting the external caller to enter a personal identification number; and receiving the personal identification number entered by the external caller.

6. The method of claim 5, further comprising:

preventing the external caller from making more than a predetermined number of attempts to enter the personal identification number.

7. The method of claim 1, further comprising:

prompting the external caller to enter a call back time for the inmate to call back the external caller;

receiving a call back time entered by the external caller; and storing the call back time in a file associated with the account information for future retrieval by the inmate or the external caller.

8. A computer-readable medium having stored thereon instructions which, when executed by a processor, cause the processor to perform the steps of:

storing a plurality of caller accounts, each caller account associated with an external caller and with a list of inmates allowed to receive a message from the external caller, wherein the external caller initiates generation of the caller account;

receiving account information from the external caller in response to a request for account information;

comparing the account information with information stored in the caller account to determine whether the caller account is valid;

receiving inmate information from the external caller in response to requests for inmate information;

comparing the inmate information with known information stored in the caller account to determine whether the inmate is on the list of inmates allowed to receive messages from the external caller;

recording a message from the external caller in response to a request from the external caller to leave a message; and storing the message in a file associated with the account information for future retrieval by the inmate.

9. A computer-implemented method of notifying a called inmate in a prison facility of messages received from a caller outside the prison facility, comprising:

receiving a message from the caller for the called inmate after determining that the called inmate is included in a list of inmates allowed to receive messages from the caller, wherein the called inmate is prevented from generating the list;

checking a database for at least one message belonging to the called inmate in the prison facility;

detecting the received message;

announcing the received message to the called inmate;

providing a plurality of options to the called inmate, at least one option for playing the received message for the called inmate; and playing the received message for the called inmate in response to the called inmate selecting the option for playing the message.

10. The method of claim 9, further comprising:

prompting the called inmate to enter a personal identification number; and receiving the personal identification number entered by the called inmate.

11. The method of claim 10, further comprising:

preventing the called inmate from making more than a predetermined number of attempts to enter the personal identification number.

12. The method of claim 9, wherein the announcing step further comprises:

announcing only those messages that have been previously announced fewer than a predetermined number of times.

13. The method of claim 9, further comprising:

allowing the called inmate to select an option from the group of options consisting of returning the call and refusing the call.

14. The method of claim 13, further comprising:

recording the option selected by the called inmate for future retrieval by the called inmate.

15. The method of claim 9 further comprising:

informing the called inmate that the caller has specified a call back time for returning the call.

16. A computer-readable medium having stored thereon instructions which, when executed by a processor, cause the processor to perform steps comprising:

receiving a message from the caller for an inmate after determining that the inmate is included in a list of inmates allowed to receive messages from the caller, wherein the inmate is prevented from generating the list;

checking a database for at least one message belonging to an inmate housed within the prison facility;

detecting the received message;

announcing the received message to the inmate;

providing a plurality of options to the inmate, at least one option for playing the received message for the inmate; and playing the received message for the inmate in response to the inmate selecting the option for playing the message.

17. An inmate messaging system for notifying an inmate in a prison facility of telephone messages received from a caller outside the prison facility, comprising:

line control devices configured to interface the inmate messaging system with a telephone network;

a processor coupled to the line control devices configured to process telephone signals received from the telephone network;

a memory coupled to the processor, the memory comprising:

a remote caller module configured to cause the processor to perform steps comprising:

storing a plurality of caller accounts, each caller account associated with a caller and with a list of inmates allowed to receive a message from the caller, wherein inmates are prevented from generating the caller account;

receiving account information from a caller in response to a request for account information;

comparing the account information with information stored in the caller account to determine whether the caller account is valid;

receiving inmate information from the caller in response to requests for inmate information;

comparing the inmate information with known information stored in the caller account to determine whether the inmate is on the list of inmates allowed to receive messages from the caller;

recording a message from the caller in response to a request from the caller to leave a message; and storing the message in a file associated with the account information for future retrieval by the inmate;

an inmate caller module configured to cause the processor to perform steps comprising:

checking a database for at least one message belonging to an inmate housed within the prison facility;

announcing the message to the inmate;

providing a plurality of options to the inmate, at least one option for playing the message for the inmate; and playing the message for the inmate in response to the inmate selecting the option for playing the message.

18. The system of claim 17, further comprising:

a speech digitizer configured to record digitally the voice of the caller in response to a prompt from the system asking the caller to state the caller's name; and a storage device configured to store the digital recording for future retrieval by the inmate or the caller.

19. The system of claim 17, further comprising:

a telephone interface coupled to the processor configured to interface the inmate messaging system with a computer network, the computer network configured to permit an operator to monitor and control the inmate messaging system from a remote location.

20. The system of claim 17, wherein the memory further comprises:

a call detail record having a plurality of data fields configured to store information from at least one information category from a group of information categories consisting of account information, message information, and inmate information.

21. A computer-implemented method of notifying an inmate in a prison facility of messages received from a caller outside the prison facility, comprising:

storing a plurality of caller accounts, each caller account associated with a caller, with an account identifier, and with a list of inmates allowed to receive a message from the caller, wherein the inmates are prevented from generating the caller account;

receiving an account identifier from a caller in response to a request for an account identifier;

determining whether the account identifier is associated with a valid account;

receiving an inmate identifier from the caller in response to requests for inmate information;

determining whether the inmate is on the list of inmates associated with the caller account;

recording a message from the caller in response to a request from the caller to leave a message; and storing the message in a file associated with the inmate for future retrieval by the inmate.

22. A method of receiving a message from a party external to an institution, intended for a party inside the institution, comprising:

storing a plurality of accounts, each account associated with an external party, with an account identifier, and with a list of internal parties allowed to receive a message from the external party, wherein the internal party is prevented from requesting preparation of the account;

receiving an account identifier from an external party in response to a request for an account identifier;

determining whether the account identifier is associated with a valid account;

receiving an identifier associated with an internal party from the caller in response to requests for an internal party identifier;

determining whether the internal party is on the list of parties associated with the account;

recording a message from the external party in response to a request from the external party to leave a message; and storing the message in a file associated with the internal party for future retrieval by the internal party.

* * * * *